United States Patent [19]
Pun

[11] Patent Number: 5,701,483
[45] Date of Patent: Dec. 23, 1997

[54] DATA ACESS IMPLEMENTATION OF DEVICE DRIVER INTERFACE

[75] Inventor: Sherman S. Pun, Sunnyvale, Calif.

[73] Assignee: Sun Microsystems, Inc., Mountain View, Calif.

[21] Appl. No.: 789,158

[22] Filed: Jan. 24, 1997

Related U.S. Application Data

[63] Continuation of Ser. No. 499,736, Jul. 7, 1995, abandoned.

[51] Int. Cl.$^6$ .................................................. G06F 9/44
[52] U.S. Cl. .................................................. 395/681
[58] Field of Search ........................... 395/681, 680, 395/685, 701, 702, 703, 705, 710

[56] References Cited

U.S. PATENT DOCUMENTS

| | | | |
|---|---|---|---|
| 5,265,252 | 11/1993 | Rawson, III et al. | 395/681 |
| 5,319,751 | 6/1994 | Garney | 395/681 |
| 5,430,845 | 7/1995 | Rimmer et al. | 395/681 |
| 5,459,867 | 10/1995 | Adams et al. | 395/681 |
| 5,465,364 | 11/1995 | Lathrop et al. | 395/681 |
| 5,475,836 | 12/1995 | Harris et al. | 395/681 |

OTHER PUBLICATIONS

Article by Steven Baker entitled "Solaris 2 Revisited" published by Unix Review, Jun. 1995, pp. 49–55.

Article by Stephen Rago Entitled "XDR: Moving Data Between Platforms (external data representation)" published by Unix Review, Jun. 1994, vol. 12, No. 6, starting at p. 55 (8 sheets).

PCI Bus Binding to IEEE 1275–1994 Standard for Boot (Initialization, Configuration) Firmware, Rev. 1.4, Open Firmware Task Force of the PCI Alliance, Dec. 16, 1994.

*Primary Examiner*—Kevin A. Kriess
*Attorney, Agent, or Firm*—Graham & James LLP

[57] ABSTRACT

A device driver interface for achieving portability of device drivers for operating with full source level compatibility across multiple instruction set architectures and platforms. The device driver interface makes transparent to the driver the actual data access mechanisms of the host computers on which the driver is compiled.

23 Claims, 6 Drawing Sheets

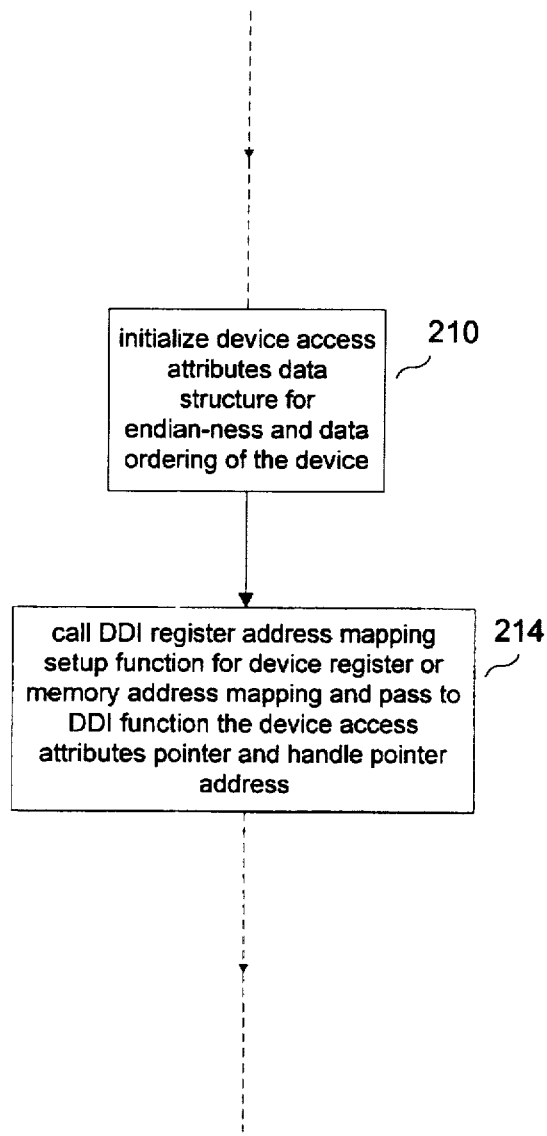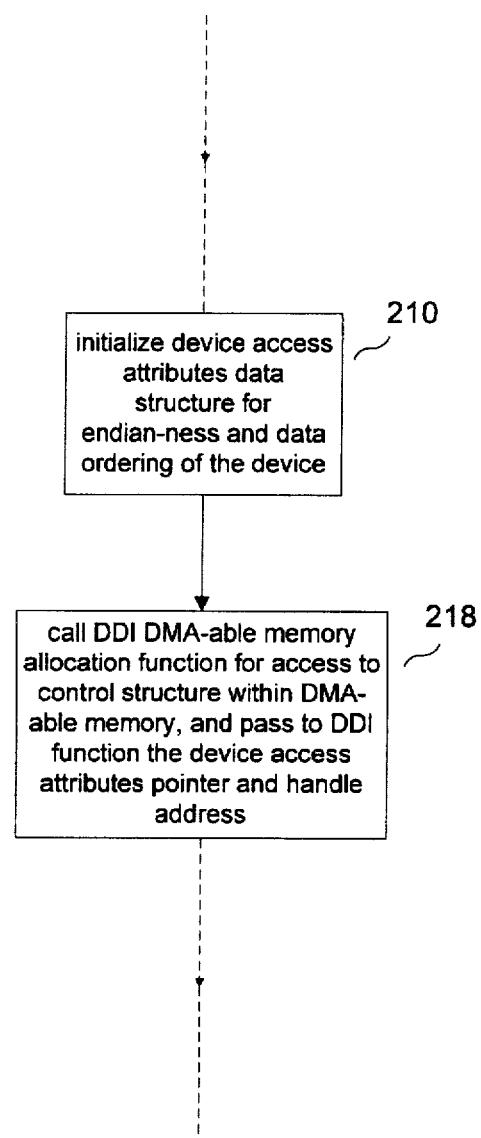
Fig. 2A
Fig. 2B

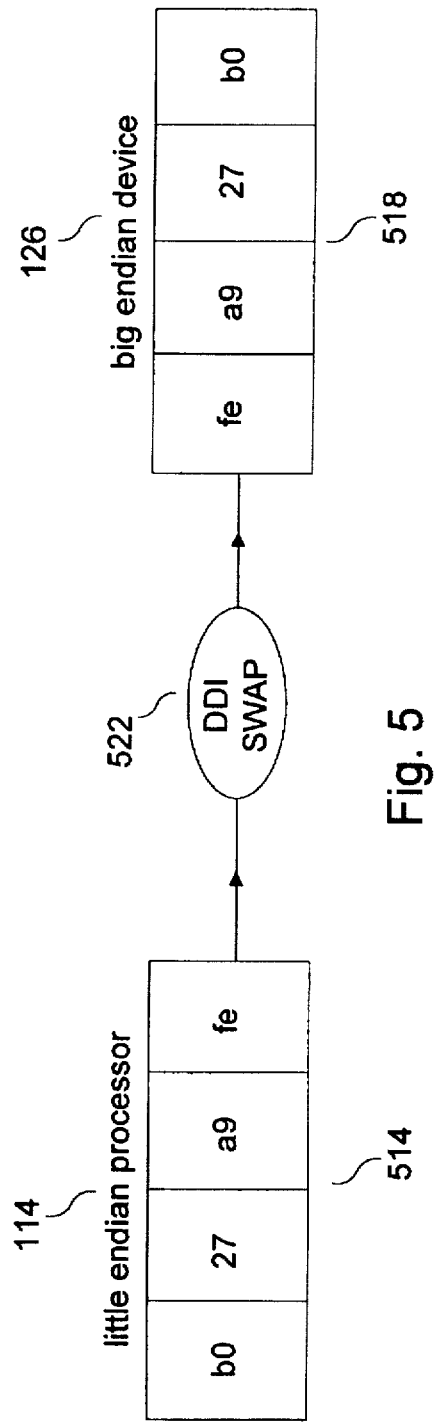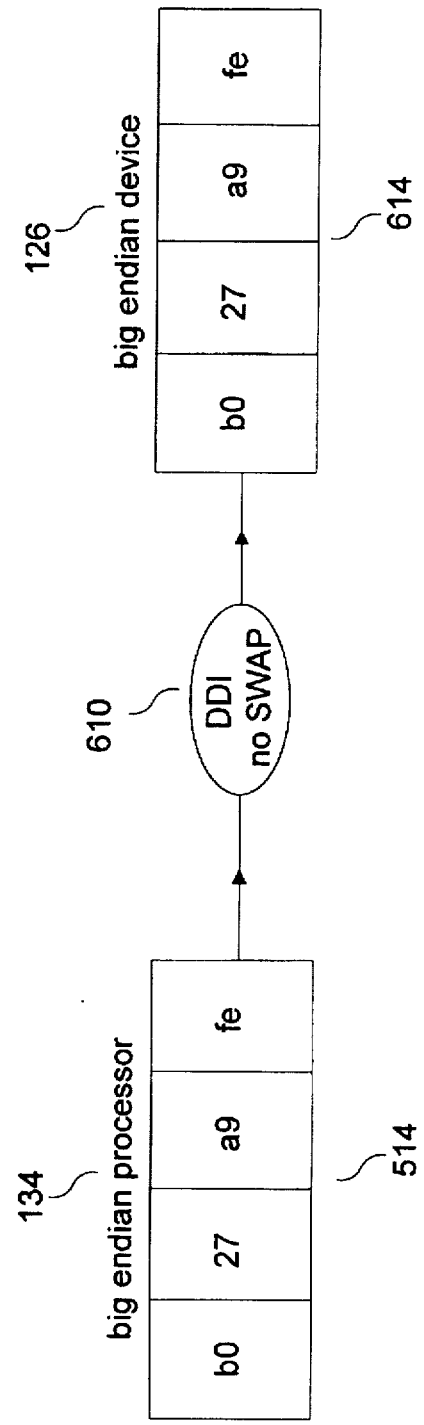
Fig. 5
Fig. 6

DATA ACESS IMPLEMENTATION OF DEVICE DRIVER INTERFACE

This application is a continuation under 37 C.F.R. §1.62 of prior application Ser. No. 08/499,736 filed Jul. 7, 1995 for "DATA ACCESS IMPLEMENTATION OF DEVICE DRIVER INTERFACE", now abandoned.

BACKGROUND OF THE INVENTION

1. Field of the Invention

The present invention relates to device driver interfaces. More particularly, but without limitation, the present invention relates to device driver interfaces that allow device drivers to operate with full source level compatibility across multiple Instruction Set Architectures (ISA) and platforms.

2. Description of Related Art

In the past, developers of device drivers created separate versions of device drivers that are compatible with specific instruction set architectures and with specific platforms of the instruction set architectures. Examples of processors with different instruction set architectures are Intel's x86 (80386, 80486, Pentium), IBM and Motorola's Power PC (PPC), and SPARC. SPARC is a trademark of Sun Microsystems, Inc. An example of two specific platforms of an instruction set architecture are two computers that have the same processor, but have different memory controllers. One of the memory controllers may, for instance, have hardware that can be programmed to do byte swapping and data reordering for achieving compatibility between the endian-ness of a processor and that of a device, as is explained below.

Examples of device components are a random access memory (RAM) and registers mounted on top of devices peripheral to a processor. Such peripheral devices can be add-on boards (e.g., a graphics framebuffer adaptor, a network interface adaptor, and a small computer system interface (SCSI) host bus adaptor). Devices can be moved from one computer to another. Examples of components that appear on these add-on boards are random access memory (RAM) and registers. These device components have different data representation, such as big or little endian which may or may not be different from the computer. (Below, the term "device" refers to devices as well as to device components.)

Typically, the device driver itself is a set of processor instructions stored in a memory of a host computer for controlling a device. Sometimes, there are differences between how a host processor and a device communicate and interpret shared data. For example, there may be a difference in endian-ness (byte ordering) between different host processors and devices in communicating and interpreting a value stored in a command register on a device.

There are two major types of endian-ness. One host processor may be little endian, while another processor may be big endian. The device itself may be big endian. For example, a processor that is big endian communicates and interprets a multi-byte word beginning with the most significant byte. Similarly, a processor that is little endian communicates and interprets a multi-byte word beginning with the least significant byte. Processors with different endian-ness are for example the x86 processor family, which is little endian, while the SPARC architecture is big endian. A PPC uses a processor which is bi-endian, which means that it has both big and little endian mode settings. Devices exhibit the same types of endian-ness. Device A may have a big endian I/O processor and thus communicates and interprets multi-byte words using big endian format, while device B may have a little endian I/O processor and thus communicates and interprets multi-byte words using little endian format.

Conventionally, a device driver accounts for the specific differences between a specific host and the device. So, for a case of, for instance, a device driver for a little endian device running on a big endian host, the device driver accounts for the difference in endian-ness by switching the order of the bytes in the word before passing on the word to the device.

However, running the same driver on another host that has the same endian-ness as the device (instead of opposite) causes miscommunication (or incompatibility) between the host and the device. This incompatibility results from the driver always switching the order of the bytes in a word.

Another difference between processors is that processors differ in their data transfer capabilities, specifically in their ability to order data. Some processors are capable only of strictly ordering data. Strict order means that the processor can only transmit a stream of data in the same order in which the processor received the data. Some processors can only transmit data in the same order as the execution and processing sequence of the instructions. In data reordering, a processor can reorder a stream of data. Some processors are capable of data merging. Data merging permits combining a single datum into a multi-word data batch and sending the batch at one time, instead of sending one single datum after another. Some processors also may have capabilities such as cache loading and cache storing. In cache loading, the processor can cache data that it fetches and reuse that data until other data is stored in cache in place of the original data. In cache storing, the processor can keep data in memory cache and later push it to a device (sometimes with other data).

Similar to the situation with endian-ness, a developer tailors a conventional driver to the particular data transfer capabilities of the specific host computer. However, a driver written to take advantage of the data transfer capabilities of a specific host cannot be run on another host without those data transfer capabilities.

A host computer and a device typically are connected by a bus, for example the peripheral component interconnect (PCI) local bus. The bus architecture typically includes a bus, as well as a bus bridge, as, for example a PCI host bridge and other bus bridges connected to the host bridge, such as PCI to PCI bus bridges and PCI to ISA-bus bridges. To communicate with a device, a processor can access a device by knowing the device's bus address. In addition, each bus address domain may be further divided into separate address spaces. For example, the PCI Local Bus provides for three distinct address spaces: Configuration, Memory, and I/O Space. Device registers or memory can appear in any of the three PCI address spaces. The method of accessing different bus address spaces can be host computer dependent. Thus, a driver written to communicate across one bus on one ISA/platform may be incompatible with same bus on another platform.

Another way in which a host can communicate with a device is by sharing a portion of the host memory (DMA-able memory) with the device. In this context, DMA-able memory refers to memory used for controlling structures shared by a host and a device. DMA-able memory exhibits endian-ness and data ordering characteristics that vary among hosts. So, again, a driver written to communicate with a device via a particular host's DMA-able memory may be incompatible with DMA-able memory of another host.

Therefore, there is a need for a device driver interface that would permit a device driver developer to develop a driver independently of the attributes of the hosts on which the device driver might run and of the bus connecting the host and the device. This would result in the portability of a driver between various instruction set architectures and platforms.

SUMMARY OF THE INVENTION

This invention provides a method and apparatus for achieving portability of device drivers, such that device drivers can operate with full source level compatibility across multiple instruction set architectures and platforms. Devices and computer hosts of drivers can have different data access attributes. For example, a host can be big endian, while a device controlled by the host can be little endian. An embodiment of this invention provides a device driver interface (DDI) environment implementation that supports the data access attributes of the host that executes the device driver. The DDI environment uses both the data access attributes of the device and of the host to provide data access compatibility between the host and the device. In this fashion, the device driver does not need information about the host's data access attributes.

From a process standpoint, a preferred embodiment of the invention comprises the following steps. The method allocates memory space in a DDI environment for a handle. The DDI environment selects at least one of at least two DDI data access function implementations. The selected implementation accounts for differences between the host and device data access attributes. The DDI environment stores information in the handle for accessing the DDI data access function implementation. The DDI environment passes a handle pointer to the driver for opaque access by the driver to the device through the DDI environment, which uses the information in the handle for invoking the DDI data access function implementation. As mentioned above, the driver has no information about the host's data access attributes.

DESCRIPTION OF THE DRAWINGS

The invention will now be described with reference to the accompanying drawings, wherein:

FIGS. 2A and 2B together illustrate a flowchart of a set-up procedure of the driver for data access to the device.

FIG. 5 illustrates an example of a device driver interface function implementation.

FIG. 6 illustrates an example of a device driver interface function implementation.

DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
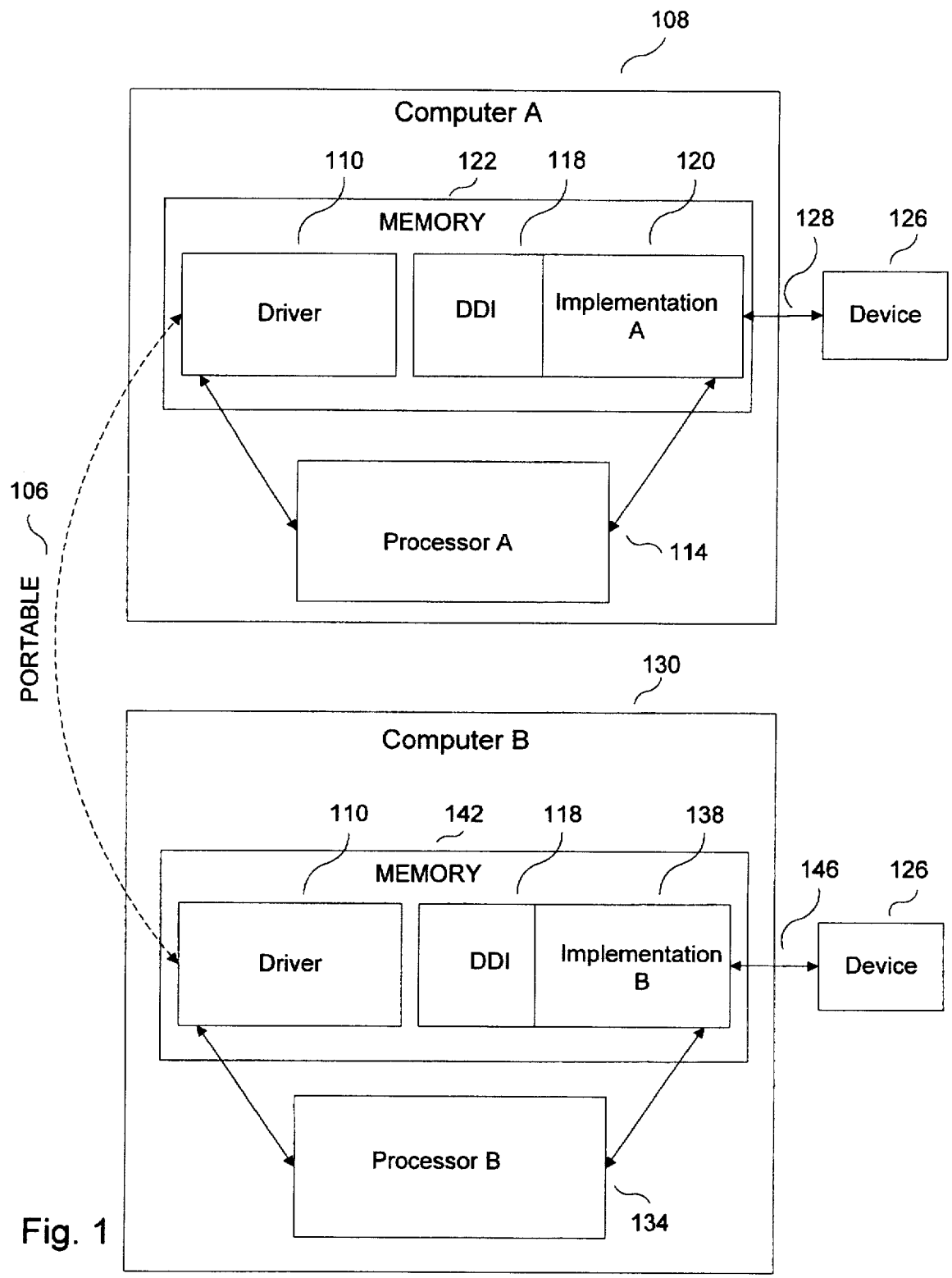
FIG. 1 illustrates a general computer block diagram, which shows to portability of a driver.

A preferred embodiment of the invention is illustrated in FIG. 1. The preferred embodiment of the invention as described below is preferably implemented as a portion of an operating system to be released under the name Solaris 2.5 by Sunsoft, A Sun Microsystems, Inc. Business. "Solaris" is a registered trademark of Sun Microsystems, Inc. It will be clear to those skilled in the art that the embodiment described herein may be implemented in various operating systems. Furthermore, computer code which is described below is preferably written in the computer language C. C is a high level programming language developed at Bell Labs. But the preferred embodiment can be implemented using other computer languages as well.

FIG. 1 illustrates how this embodiment of the invention achieves portability (as illustrated by a double headed arrow 106) of a source code of the driver 110. In FIG. 1, a host computer A 108 contains a device driver 110, which is coupled via a processor A 114 of computer 108 to a combination of a common portion 118 of a device driver interface and sometimes a DDI host specific implementation 120 (hereinafter, the combination is referred to as DDI). The driver 110 (i.e. the source code of driver 110 compiled with a compiler (not shown) of host 108) and the DDI 118, 120 are stored in memory 122 of the host 108. Preferably, the DDI 118, 120 are computer instructions, which are a part of the operating system of the host 108. The driver 110 communicates with a device 126 via a bus architecture 128.

The same driver 110 can be compiled to run on another host with a different Instruction Set Architecture (with a compiler (not shown)), such as computer B 130, which has a processor 134 different from processor 114, as discussed below, but is otherwise similar to host 108. For simplicity, only two hosts 108, 130 are shown, although, as will become clear below, this embodiment makes possible the portability 106 of driver 110 among any number of different hosts. In host 130, the driver 110 is coupled via processor 134 to a combination of the common portion of the DDI 118 with another host specific portion DDI implementation 138. As in host 108, in host 130, the driver 110 and the DDI 118, 138 are stored in memory 142 of the host 130. Also, the DDI 118, 138 preferably is a part of the operating system of host 130. The driver 110 communicates with the device 126 via a bus architecture 146.

Device driver 110 preferably is computer code written for controlling device 126, without regard to the particular host 108 or 130 which will execute driver 110. However, as also described above, there are differences in the ways different computers process data. For example, different computers have different endian-ness and different data ordering attributes. To achieve portability 106 of driver 110 between hosts 108 and 130, this embodiment provides DDI host specific implementations 120 and 138 for each host 108 and 130, respectively. The driver 110 only has to know the particular attributes of the device 126, such as endian-ness and data ordering. The driver 110 supplies these device attributes to the common portion of the DDI 118. The DDI host specific implementation 120 or 138, knows the data processing attributes of its particular processor 114 or 134 and of the bus architecture 128 or 146, respectively, for which the particular host is typically customized. Using this knowledge (as will be explained below), the DDI host specific implementations 118 and 138 adjust data passed between the driver 110 and the device 126 by accounting for the differences in the data processing attributes and the bus addressing attributes between their respective hosts 108 and 130, respectively, and the device 126. However, as will be explained below, some hosts 108 or 130 have hardware that obviates the need for the DDI host specific portions 120 or 138.

FIG. 2 illustrates a preferred setup procedure of the driver 110 for data access to the device 126. FIG. 2 is a flowchart of that part of the driver 110 code that sets up the DDI combination 118 and (120 or 138). The DDI combination 118 and (120 or 138) hides the endian-ness from the driver 110. In step 210 of FIG. 2A, the driver 110 initializes a device access attributes data structure for DDI register mapping. In step 210 of FIG. 2B, the driver 110 initializes a device access attributes data structure for DMA-able memory allocation. (An example of an access attributes data structure is shown on page 1 of the appendix.) Also in step 210 of FIG. 2 (2A and 2B), the driver 110 stores the attributes of the device 126 in the device access attributes data structure. Attributes that are stored are the endian-ness and the data ordering attributes of the device 126 (see pages 1-2 of the appendix for examples of values of these attributes).

In step 214 of FIG. 2A, the driver 110 calls a DDI register address mapping setup function for setting up data access with a particular device 126. Once the driver 110 has called this setup function, the driver 110 has performed all that is necessary for establishing compatible communications between the host 108, 130 and the device 126 via the bus 128, 146. (An illustrative list of standardized function names for use by a driver developer is included in the appendix. See, for example, the function ddi_regs_map_setup on page 5 of the appendix. The function ddi_regs_map_setup is an example of the DDI setup function of step 214).

In calling the DDI register address mapping setup function, the driver 110 preferably passes to the DDI register address mapping setup function the device attributes pointer and a storage address of the handle (handle pointer address). The device attributes pointer contains the address of the device access attributes data structure allocated in step 210. The handle pointer address contains the memory location in which the DDI register address mapping setup function stores an address of a handle structure, which the DDI register address mapping setup function creates, as discussed below. By only requiring the driver 110 to provide a handle pointer address for the handle structure, the driver 110 does not have to know anything at all about the handle structure. In other words, the handle structure is opaque to the driver 110. As will become clear below, this opaqueness helps make the driver 110 portable (see arrow 106).

For data access to control structures within DMA-able memory, in step 218 of FIG. 2B, the driver 110 calls a DDI DMA-able memory allocation function for data access via a sharable memory. As described above with respect to step 214, in making the call, the driver 110 passes to the DDI DMA-able memory allocation function the device access attributes pointer and handle pointer address. (For an example of a DDI DMA-able memory allocation function, see pages 6-7 of the appendix). Although, not shown in FIG. 2, the driver 110 can be written to contain code illustrated in step 214, or step 218, or both.

Figure 3:
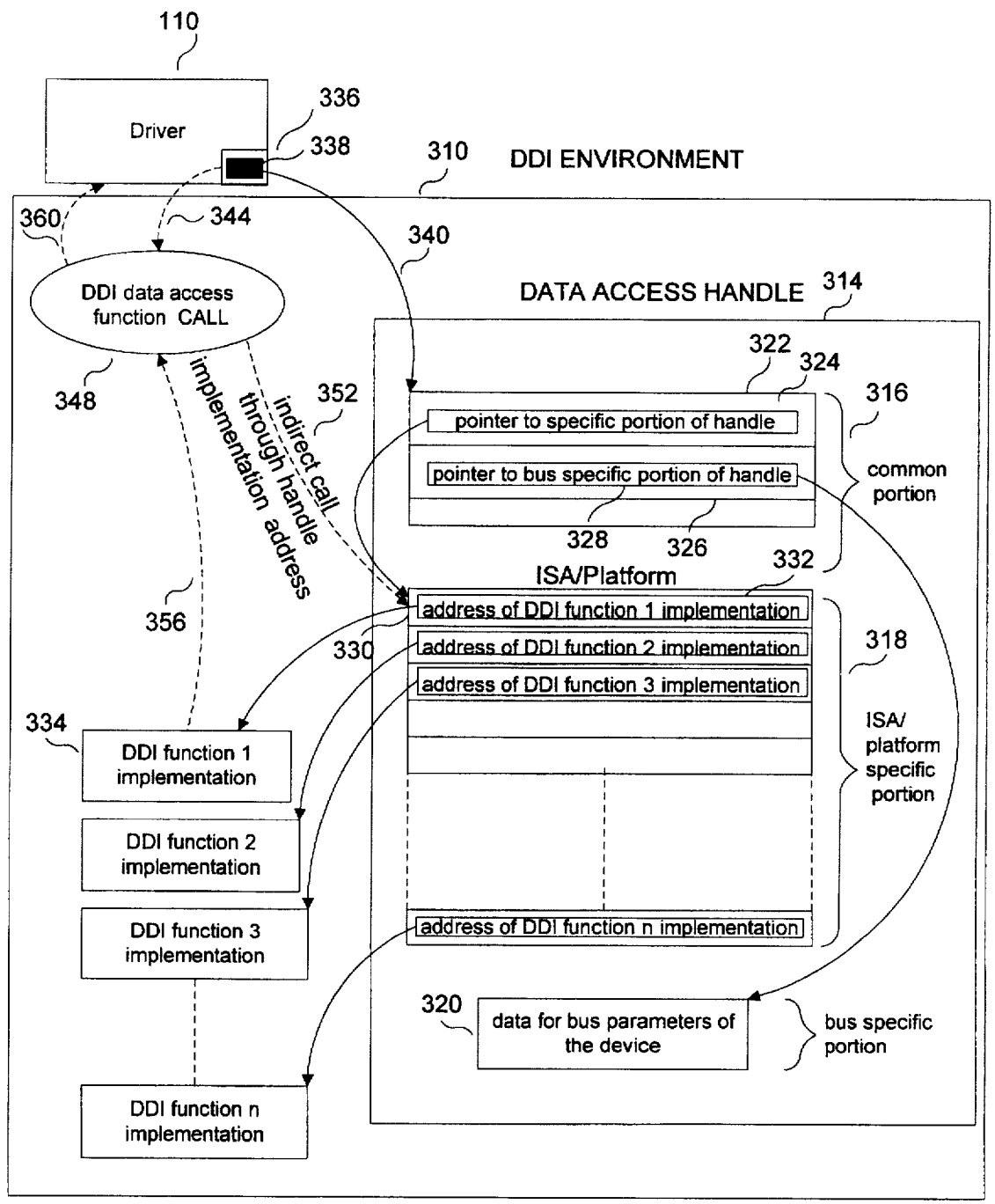
FIG. 3 illustrates a sub-system block diagram of the driver and a device driver interface environment.

FIG. 3 illustrates a preferred communication link between the driver 110 and the DDI environment 310 containing the handle structure 314, all of which is preferably a part of the operating system of the host 108, 130. FIG. 3 further illustrates some of the details of the handle structure 314 and how it is used. As discussed above, the driver 110 calls a DDI register address mapping setup function. Memory storage space for the handle structure 314 is allocated by the DDI register address mapping setup function within the DDI environment 310. Preferably the handle 314 has a common portion 316, as well as a host specific portion 318 and a bus specific portion 320. The common portion 316 is in the common portion of the DDI 118 in FIG. 1. The host specific portion 318 and the bus specific portion 320 is included in the DDI host specific implementation 120 of FIG. 1.

Preferably, the common portion 316 of the handle 314 contains in a memory location 322 a pointer 324, which points to the ISA/platform specific portion 318 of the handle 314. Another memory location 326 in the common portion 316 of the handle 314 contains a pointer 328 to the bus specific portion 320 of the handle 314.

The bus specific portion 320 of the handle 314 preferably contains data for bus parameters, such as data identifying the location of a device 126 on a bus 128 or 146. The ISA/platform specific portion 318 preferably contains in individual memory storage spaces 330 addresses 332 of DDI data access function implementations 334. The addresses 332 of the DDI data access function implementations 334 are the locations in memory of the DDI environment 310 where the actual DDI data access function implementations 334 are located.

As will be explained below, preferably, the driver 110 has stored in a memory storage space 336 a handle pointer 338. This handle pointer 338 points 340 to the handle 314 in the DDI environment 310. As will be explained below in more detail, to execute a DDI data access function, such as a read from or a write to the device 126, basically the driver 110 passes (as indicated by an arrow 344) the handle pointer 338 (as well as other function arguments) to a DDI data access function call 348. The DDI data access function 348 indirectly calls (as indicated by an arrow 352) a DDI data access function implementation 334. Preferably, the DDI data access function call 348 executes the indirect call 352 by calling the address 332 of the DDI data access function implementation 334. The DDI data access function call 348 locates the DDI data access function implementation address 332 via the pointer 324, which points to the ISA/platform specific portion 318 of the handle 314.

The selected DDI data access function implementation 334 returns (indicated by arrow 356) a value to the DDI function call statement 348. While, for the sake of simplicity, the discussion here is in terms of a single DDI implementation function 334, there can be, as shown in FIG. 3, many DDI data access function implementations 334, each of which in turn has an address 332. The DDI data access function call statement 348 returns (as indicated by an arrow 360) the value of the DDI function 334 to the driver 110.

As discussed above, when the driver 110 reads from or writes to the different bus address spaces of the device 126, it commonly does so via a bus address space on the bus architecture 128 or 146. To obtain the address space mapping of the device 126, the driver 110 preferably executes the setup function discussed above, which returns to the driver 110 the address of the device 126 on the bus 128 or 146. As further discussed below, the operation by which the DDI environment 310 obtains the device address space location is transparent to the driver 110. This means that the driver 110 can be written by the driver developer without explicitly calling out the different address spaces during data accesses.

To execute a DDI data access function (such as read or write), the driver 110 simply needs to call that DDI data access function and pass it the handle pointer 338 and the device address. Examples of functions that read data from the device 110 are illustrated in the appendix (see, for example, "ddi_getw" on page 8 of the appendix, which is a function for reading 16 bit data from a device 126). Once the driver 110 has called the DDI data access function, the DDI environment 310 takes over and simply supplies a return value without the driver 110 having to know any of the details of the DDI environment's 310 operations. Of course, to call DDI data access functions, the driver 110 had to first execute step 214 and/or step 218 of FIG. 2, as discussed above. DDI data access functions other than those for reading data from the device 126 may require more input arguments as for example a DDI data access function for writing data (see page 9 of Appendix). Obviously, writing data to a device 126 requires passing (in addition to the handle pointer 338 and the device address) the actual data to be written to the device 126.

Figure 4:
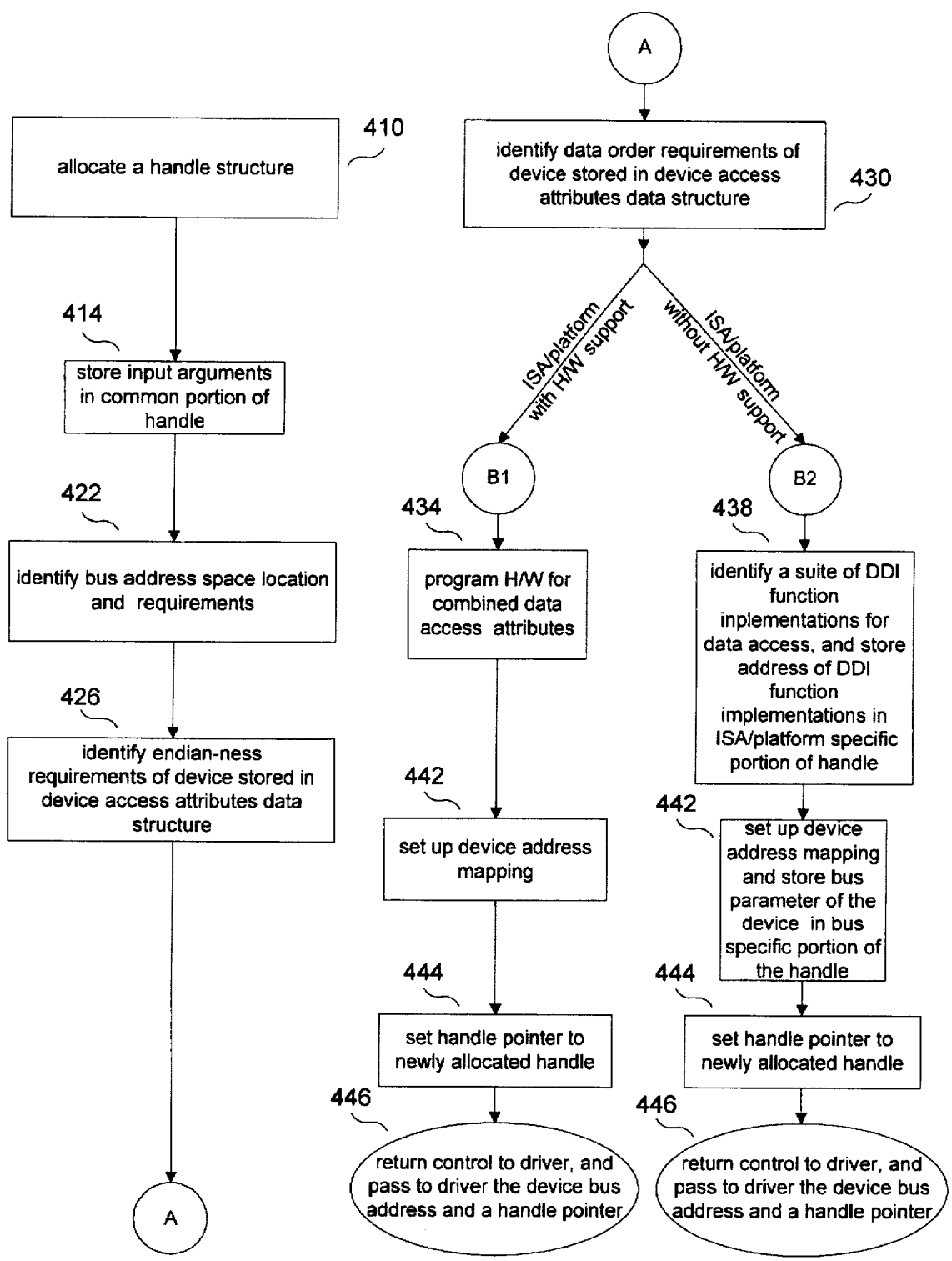
FIG. 4 illustrates a flowchart of steps performed by the DDI environment for constructing a handle.

FIG. 4 illustrates the preferred steps of constructing the handle 314 of FIG. 3. FIG. 4 is a flowchart of the steps performed by the DDI environment 310 upon the driver 110 calling the DDI register address mapping setup function in step 214 in FIG. 2. The DDI environment 310 comprises a common portion 118 (see FIG. 1) and a platform specific portion 120 or 138 in FIG. 1. As discussed further below, the DDI environment 310 performs steps similar to those illustrated in FIG. 4 when the driver 110 calls the DDI DMA-able memory allocation function of step 218 in FIG. 2 for structural control data access via sharable memory. Regardless of whether data access to the device 126 is via driver direct accesses through the bus 128 or 146 and/or via device accesses to DMA-able memory using direct memory access (DMA), the operation of the DDI environment 310 is transparent to the driver.

In step 410, the DDI function setup allocates a memory storage space for the handle structure 314. The allocated memory storage space includes memory for the common portion 316, the ISA/platform specific portion 318, and the bus specific portion 320. Preferably, however, the ISA/platform specific portion 318 is allocated only if the host computer 108 or 130 does not have hardware support. In that case, the DDI setup function will use a software function implementation, to implement DDI data access functions 334, as will be explained further below. Similarly, as will be explained further below, preferably the bus specific portion 320 is allocated only if the host cannot directly read/write to the device 126 coupled to the bus architecture 128 or 146 through memory mapped address.

Next, in step 414, the DDI setup function stores in the common portion 316 of the handle 314 input arguments that were passed to it in step 214 of FIG. 2. As mentioned above, input arguments that are passed from the driver 110 to the DDI 118 include the device access attributes pointer and the handle pointer address 336. The device access attributes pointer points to the memory structure in which the driver 110 has stored the device attributes, such as the device's 126 endian-ness and data ordering characteristics. In step 214 of FIG. 2, the driver 110 also passed information to the DDI register address mapping setup function about an index number to an address space set representing certain device registers. In addition, in step 214, the driver passed an offset and a length relative to that address space set of the device registers.

From these input arguments, the DDI register address mapping setup function, in step 422, identifies the bus address space location of the registers on the device 126. As mentioned above, the method of setting up bus address space mappings into host address domain is host computer 108 or 130 dependent. As explained below, the DDI environment 310 makes this host dependence transparent to the driver 110. For example, in the case of PCI devices (i.e., devices connected to the PCI Local Bus) the returned address (that is the address returned by the DDI function setup to the driver 110) can be either an address within the PCI Memory, I/O, or Configuration Space. The driver can use this returned device bus address as a base to derive effective addresses for other device 126 registers in the same address space. The driver 110, preferably accomplishes this address derivation by either adding a constant as an offset to the device bus address base or by casting the bus space address base as a pointer to a C language data structure representing the device 126 registers.

Next, the DDI register address mapping setup function identifies the device data access attributes of the device 126. In step 426, the DDI function register address mapping setup identifies the endian-ness requirements of the device 126. As mentioned above, in step 210 in FIG. 2, the driver 110 stores the endian-ness attribute of the device 126 in the device data access attributes data structure. For example, if a flag data "NEVER SWAP" is set, a byte swap will not be used. If the endian-ness of the device specification does not match the endian-ness of the host, a byte swap will be used under all data accesses, as explained below.

Next, the DDI register address mapping setup function preferably executes a step 430, unless the host computer 108 or 130 can only access the device 126 with strict data ordering. In this case, strict data ordering is used under all data accesses. The DDI setup function retrieves the device's 126 data ordering specification from the device access attributes structure. The DDI function then selects a data ordering method based on the host's 108 or 130 capabilities. For example, if the driver 126 specifies merging, but the host 108 or 130 can only perform data reordering, then data reordering, which is less flexible than merging, will be used under all data accesses.

Since each DDI implementation 120, 138 is written specifically for the particular host 108, 130 respectively, there is a split in the steps that are taken next by the DDI setup function. The split (B1, B2) occurs because some Instruction Set Architectures and some platforms of Instruction Set Architectures have I/O hardware support (B1) and other Instruction Set Architectures and platforms (B2) do not have. Those Instruction Set Architectures and platforms have I/O hardware support which permits the DDI register address mapping function setup in step 434 to program the hardware to account for the device attributes, such as endian-ness, data ordering and bus address space mapping requirements. In the B1 branch, preferably, the DDI register address mapping setup function of the particular DDI implementation 120 or 138 does not allocate storage space for the ISA/platform specific portion 318 and bus specific portion 320 of the handle structure 314. The reason for this will become clear below.

In step 442 of the B1 branch, the DDI setup function does the bus address mapping of the device 126. In some cases, the bus architecture 128, 146 includes hardware that allows the DDI setup function to program the bus hardware, which then automatically executes the bus address mapping of step 442. Without such bus address mapping hardware capability, the DDI implementation 120 or 138 in step 442, preferably involves selecting suites of software functions, as explained below in the context of the B2 branch of the flowchart of FIG. 4.

In step 442 of the B1 branch, the DDI register address mapping setup function does the bus address mapping of the device 126. In step 444 of the B1 branch, the DDI setup function sets the handle pointer 338 to point to the newly allocated handle 314. A separate handle 314 is allocated for each device 126 address mapping, when the driver 110 calls the DDI register address mapping setup function.

In step 446, the DDI setup function returns control to the driver 110. In the process of doing so, the particular DDI implementation 120 or 138 passes to the driver 110 the device bus address as obtained in step 442 and stores the handle pointer 338 in the memory storage 336 of the driver 110.

In the B2 branch of the flowchart in FIG. 4, the DDI register address mapping setup function executes step 438. In the B2 branch, the particular DDI implementation 120 or 138 does not have the hardware support in the host computer 108 or 130. In step 438, the DDI setup function identifies a suite of DDI data access function implementations 334 (see FIG. 3) for accessing the device 126. As explained below, the DDI data access function implementations 334 use software methods to handle the attribute differences of the host processor 114 or 134 and the device 126. As discussed above, the DDI setup function stores the addresses 332 of the DDI data access function implementations 334 in the ISA/platform specific portion 318 of the handle 314 in memory storage 330.

An example of a DDI data access function implementation 334 for software byte swapping is illustrated in FIG. 5. In FIG. 5, the driver 110, running on a little endian processor 114, sends a four-byte word 514 to a big endian device 126. The DDI data access function implementation 522 (334 in FIG. 3) swaps the order of the bytes of the word 514 and transforms the word 514 into a big endian data representation for the device 518. FIG. 6 shows another example of another DDI function implementation 610 (334 in FIG. 3). In FIG. 6, the driver runs on a host processor 134 that is big endian. Here the driver 110 is sending a four-byte word 514 to a device 126, which is also big endian. In FIG. 6, the DDI data access function implementation 610 does nothing or is a no-swap function, which preserves the order of the bytes in the word 614 as it existed in the word 514.

Another example of DDI data access function implementations 334 are functions that use capabilities of some processors to reorder data, to merge data, to do cache loading, and/or to do cache storing. For example, the driver 110 may advise the DDI environment 310 to use certain data ordering attributes. As discussed above, the driver 110 gives permission to use certain data ordering attributes by setting appropriate flags in the device access attributes structure (see page 1 of the appendix for examples of such flags). As shown in the appendix, giving permission to do one type of data ordering may imply giving permission to do other types of data ordering.

A library of different DDI data access function implementations 334 are stored in the operating system of the host 108, 130, preferably in the DDI environment 310. In step 438 of FIG. 4, the DDI environment preferably executes if/then/else statements, to decide which addresses 332 of which DDI data access function implementations 334 to store in the ISA/platform specific portion 318 of the handle 314. To illustrate, a computer instruction in the DDI register address mapping setup function of the DDI implementation 120 or 138 for a little endian host processor 114 or 134 may read as follows: if the specified device access attribute is big endian, then store in the memory storage 330 the addresses 332 of the DDI data access function implementations 334 that do byte swapping for reading from and writing to the device 126. Then, when the driver 110 invokes a DDI data access function that, for example, sends a four-byte word to the device 126, the DDI data access function call 348 is executed indirectly 352 by calling the DDI data access function implementation 522 of FIG. 5 (334 in FIG. 3). In this embodiment, had the specified device access attribute been little endian, then the DDI implementation 120 or 138 would have stored in the memory storage 330 the addresses 332 of the DDI data access function implementations 334 that do not perform byte swapping for reading from and writing to the device 126.

Similar to the handling of the endian-ness issue, in step 438, the DDI setup function of the DDI implementation 120 or 138 also executes if/then/else computer instructions for selecting from the library of DDI data access function implementations 334 the appropriate addresses 332 for data ordering and different bus address space accesses.

Returning to FIG. 4, in step 442, of the B2 branch, since the data access functions are performed using a software method, the DDI register address mapping setup function preferably stores certain bus parameters in the bus specific portion 320 of the data access handle 314. When accessing the PCI Local Bus Configuration Space, an example of bus specific information is the device's 126 location in terms of bus number, device number, and function number. This information can be used by the selected DDI data access function implementation 334. Returning to the B2 branch of FIG. 4, following step 442, the DDI setup function executes steps 444 and 446 in a manner similar to that of branch B1 of FIG. 4.

This embodiment, as illustrated in FIG. 4, is preferably modified when the device 126 and the host computer 108 or 130 communicate using the direct memory access (DMA) method, as discussed above. Basically, the DDI DMA-able allocation function illustrated in FIG. 4, executes all of the steps shown in FIG. 4, except steps 422 and 442. Step 422 is not used, because in the direct memory access method, the device and the host communicate by accessing memory internal to the host 108, 130, thereby obviating the need for taking bus 128, 146 address spaces into considerations. Similar reasoning leads to omitting step 442, which involves doing bus address mapping.

Figures 7A, 7B:
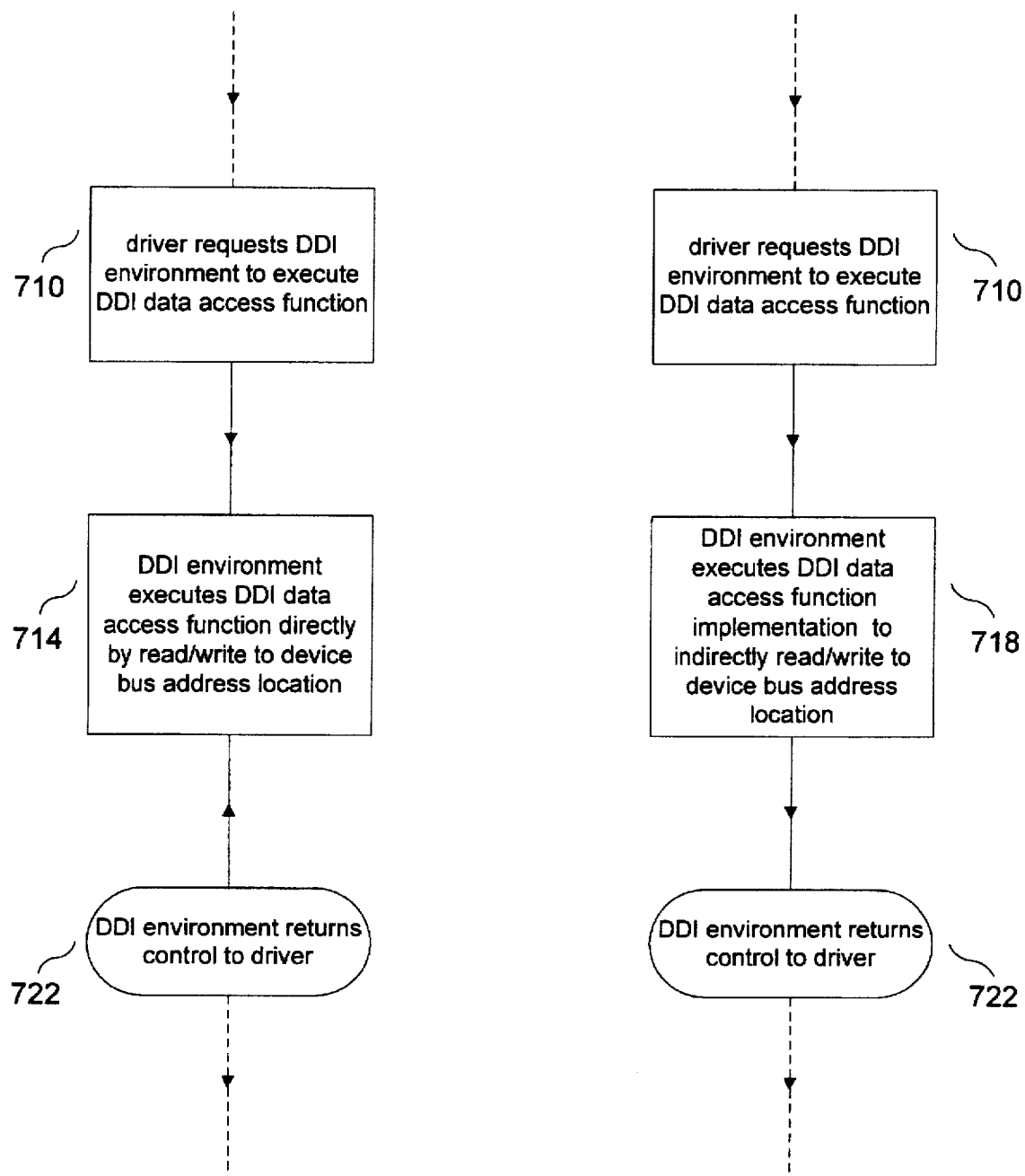
FIGS. 7A and 7B together illustrate a flowchart of a final outcome of the invention.

FIGS. 7A and 7B illustrate and summarize how the driver 110 executes a DDI data access function. FIGS. 7A and 7B are similar, except that in FIG. 7A hardware (H/W) support is available for performing I/O, whereas in FIG. 7B there is no hardware (see steps 714 and 718, respectively, as discussed below). However, as discussed above, the presence or absence of this hardware is transparent to the driver 110. In steps 710 of FIGS. 7A and 7B, the driver 110 calls a DDI data access function such as one for writing data to a device memory or register of a device 126 or even to data control structures within an allocated DMA-able address (see, for example, page 8 of the appendix). In step 710, the driver 110 passes 344 (as discussed in the context of FIG. 3) the device bus address (or a DMA-able memory address) and the handle pointer 340 to the DDI data access function call statement 348 in the DDI environment 310.

In step 714 of FIG. 7A, the DDI environment 310 (see FIG. 3) uses the I/O hardware, which it has programmed. Therefore, in step 714, the data access DDI function is executed by a direct read/write to the device bus address. Next, in step 722, the DDI data access function returns control to the driver 110 (along with a value of the DDI function called by the driver 110, if appropriate). For the case of the driver 110 sending a word to the device 126, a result of the function called by the driver 110 is that the word has been written from the driver 110 to the device 126 at the specified device bus address, accounting for the endian-ness and data ordering attributes differences between the driver 110 and the device 126.

In step 718 of FIG. 7B, the DDI environment 310 has no I/O hardware. Therefore, it uses a software implementation method. Here, the DDI environment 310 executes the function requested by the driver 110 by indirectly calling 352 the appropriate DDI data access function implementation 334 for, for example, writing a word to the device 126 to the appropriate device bus address. Thereafter, in step 722, the DDI environment 310 returns control to the driver 110.

Several preferred embodiments of the present invention have been described. Nevertheless, it will be understood that various modifications may be made without departing from the spirit and scope of the invention. For example, the DDI environment 310 could account for host 108, 130 attributes, other than those mentioned above. Thus, the present invention is not limited to the preferred embodiments described herein, but may be altered in a variety of ways, which will be apparent to persons skilled in the art.

APPENDIX ddi_device_acc_attr(9S)     Data Structures for Drivers     ddi_device_acc_attr(9S)

NAME
    ddi_device_acc_attr - data access attributes structure

SYNOPSIS
    #include <sys/ddi.h>
    #include <sys/sunddi.h>

INTERFACE LEVEL
    Solaris DDI specific (Solaris DDI).

DESCRIPTION
    The ddi_device_acc_attr structure describes the data access characteristics and requirements of the device.

STRUCTURE MEMBERS
    ushort_t    devacc_attr_version;
    uchar_t    devacc_attr_endian_flags;
    uchar_t    devacc_attr_dataorder;

The devacc_attr_version member identifies the version number of this structure. The current version number is DDI_DEVICE_ATTR_V0.

The devacc_attr_endian_flags member describes the endian characteristics of the device. Specify one of the following values.

DDI_NEVERSWAP_ACC
            data access with no byte swapping.

DDI_STRUCTURE_BE_ACC
            structural data access in big endian format.

DDI_STRUCTURE_LE_ACC
            structural data access in little endian format.

DDI_STRUCTURE_BE_ACC and DDI_STRUCTURE_LE_ACC describes the endian characteristics of the device as big endian or little endian, respectively. Even though most of the devices will have the same endian characteristics as their buses, there are examples of devices with I/O an processor that has opposite endian characteristics of the buses. When DDI_STRUCTURE_BE_ACC or DDI_STRUCTURE_LE_ACC is set, byte swapping will automatically be performed by the system if the host machine and the device data formats have opposite endian characteristics. The implementation may take advantage of hardware platform byte swapping capabilities.

When DDI_NEVERSWAP_ACC is specified, byte swapping will not be invoked in the data access functions.

The devacc_attr_dataorder member describes order in which the CPU will reference data. Specify one of the following values.

DDI_STRICTORDER_ACC
            The data references must be issued by a CPU in program order. Strict ordering is the default behavior.

DDI_UNORDERED_OK_ACC
            The CPU may re-order the data references. This includes all kinds of re-ordering. (i.e. a load followed by a store may be replaced by a store followed by a load).

DDI_MERGING_OK_ACC
            The CPU may merge individual stores to consecutive locations. For example, the CPU may turn two consecutive byte stores into one halfword store. It may also batch individual loads. For example, the CPU may turn two consecutive byte loads into one halfword load. DDI_MERGING_OK_ACC also implies re-ordering.

DDI_LOADCACHING_OK_ACC ddi_device_acc_attr(9S)   Data Structures for Drivers   ddi_device_acc_attr(9S)

The CPU may cache the data it fetches and reuse it until another store occurs. The default behavior is to fetch new data on every load. DDI_LOADCACHING_OK_ACC also implies merging and re-ordering.

DDI_STORECACHING_OK_ACC

The CPU may keep the data in the cache and push it to the device (perhaps with other data) at a later time. The default behavior is to push the data right away. DDI_STORECACHING_OK_ACC also implies load caching, merging, and re-ordering.

These values are advisory, not mandatory. For example, data can be ordered without being merged or cached, even though a driver requests unordered, merged and cached together.

EXAMPLES

The following examples illustrate the use of device register address mapping setup functions and different data access functions.

Example 1

This example demonstrates the use of the ddi_device_acc_attr structure in ddi_regs_map_setup(9F). It also shows the use of ddi_getw(9F) and ddi_putw(9F) functions in accessing the register contents.

```
dev_info_t *dip;
uint_t rnumber;
ushort_t *dev_addr;
offset_t offset;
offset_t len;
ushort_t dev_command;
ddi_device_acc_attr_t dev_attr;
ddi_acc_handle_t handle;

...

/*
 * setup the device attribute structure for little endian,
 * strict ordering and 16-bit word access.
 */
dev_attr.devacc_attr_version = DDI_DEVICE_ATTR_V0;
dev_attr.devacc_attr_endian_flags = DDI_STRUCTURE_LE_ACC;
dev_attr.devacc_attr_dataorder = DDI_STRICTORDER_ACC;

/*
 * set up the device registers address mapping
 */
ddi_regs_map_setup(dip, rnumber, (caddr_t *)&dev_addr, offset, len,
        &dev_attr, &handle);

/* read a 16-bit word command register from the device*/
dev_command = ddi_getw(handle, dev_addr);

dev_command |= DEV_INTR_ENABLE;
/* store a new value back to the device command register*/
ddi_putw(handle, dev_addr, dev_command);
```

Example 2

The following example illustrates the steps used to access a device with different apertures. We assume that several apertures are grouped under one single "reg" entry. For example, the sample device has four different apertures each 32K in size. The apertures represent YUV little-endian, YUV big-endian, RGB

-2- ddi_device_acc_attr(9S)  Data Structures for Drivers  ddi_device_acc_attr(9S)

little-endian, and RGB big-endian. This sample device uses entry 1 of the "reg" property list for this purpose. The size of the address space is 128K with each 32K range as a separate aperture. In the register mapping setup function, the sample driver uses the *offset* and *len* parameters to specify one of the apertures.

```
ulong_t *dev_addr;
ddi_device_acc_attr_t dev_attr;
ddi_acc_handle_t handle;
uchar_t buf[256];

...

/*
 * setup the device attribute structure for never swap,
 * unordered and 32-bit word access.
 */
dev_attr.devacc_attr_version = DDI_DEVICE_ATTR_V0;
dev_attr.devacc_attr_endian_flags = DDI_NEVERSWAP_ACC;
dev_attr.devacc_attr_dataorder = DDI_UNORDERED_OK_ACC;

/*
 * map in the RGB big-endian aperture
 * while running in a big endian machine
 * - offset 96K and len 32K
 */
ddi_regs_map_setup(dip, 1, (caddr_t *)&dev_addr, 96*1024, 32*1024,
        &dev_attr, &handle);

/*
 * Write to the screen buffer
 * first 1K bytes words, each size 4 bytes
 */
ddi_rep_putl(handle, buf, dev_addr, 256, DDI_DEV_AUTOINCR);
```

Example 3

The following example illustrates the use of the functions that explicitly call out the data word size to override the data size in the device attribute structure.

```
struct device_blk {
        ushort  d_command;      /* command register */
        ushort  d_status;/* status register */
        ulong   d_data;         /* data register */
} *dev_blkp;

dev_info_t *dip;
caddr_t dev_addr;
ddi_device_acc_attr_t dev_attr;
ddi_acc_handle_t handle;
uchar_t buf[256];

...

/*
 * setup the device attribute structure for never swap,
 * strict ordering and 32-bit word access.
```

-3- ddi_device_acc_attr(9S)   Data Structures for Drivers   ddi_device_acc_attr(9S)

```
         */
        dev_attr.devacc_attr_version = DDI_DEVICE_ATTR_V0;
        dev_attr.devacc_attr_endian_flags = DDI_NEVERSWAP_ACC;
        dev_attr.devacc_attr_dataorder = DDI_STRICTORDER_ACC;

ddi_regs_map_setup(dip, 1, (caddr_t *)&dev_blkp, 0, 0,
               &dev_attr, &handle);

/* write command to the 16-bit command register */
        ddi_putw(handle, &dev_blkp->d_command, START_XFER);

/* Read the 16-bit status register */
        status = ddi_getw(handle, &dev_blkp->d_status);

if (status & DATA_READY)
                /* Read 1K bytes off the 32-bit data register */
                ddi_rep_getl(handle, buf, &dev_blkp->d_data,
                    256, DDI_DEV_NO_AUTOINCR);
```

SEE ALSO
    ddi_getw(9F), ddi_putw(9F), ddi_regs_map_setup(9F),
    *Writing Device Drivers* ddi_regs_map_setup(9F)  Kernel Functions for Drivers  ddi_regs_map_setup(9F)

NAME ddi_regs_map_setup - set up a mapping for a register address space

SYNOPSIS

```
#include <sys/ddi.h>
include <sys/sunddi.h> int ddi_regs_map_setup(dev_info_t *dip, uint_t rnumber, caddr_t *addrp,
    offset_t offset, offset_t len, ddi_device_acc_attr_t *accattrp,
    ddi_acc_handle_t *handlep);
```

AVAILABILITY

PCI Local Bus, SBus, ISA, EISA, MCA

ARGUMENTS

| | |
|---|---|
| dip | Pointer to the device's dev_info structure. |
| rnumber | Index number to the register address space set. |
| addrp | Pointer to the mapping address base. |
| offset | Offset into the register address space. |
| len | Length to be mapped. |
| accattrp | Pointer to a device access attribute structure of this device (see ddi_device_acc_attr(9S)). |
| handlep | Pointer to a data access handle. |

INTERFACE LEVEL

Solaris DDI specific (Solaris DDI).

DESCRIPTION ddi_regs_map_setup() maps in the register set given by rnumber. The register number determines which register set is mapped if more than one exists.

offset specifies the starting location within the register space and len indicates the size of the area to be mapped. If len is non-zero, it overrides the length given in the register set description. If both len and offset are 0, the entire space is mapped. The base of the mapped register space is returned in addrp.

The device access attributes are specified in the location pointed by the accattrp argument (see ddi_device_acc_attr(9S) for details).

The data access handle is returned in handlep. handlep is opaque - drivers should not attempt to interpret its value. The handle is used by the system to encode information for subsequent data access function calls to maintain a consistent view between the host and the device.

RETURN VALUES ddi_regs_map_setup() returns:

| | |
|---|---|
| DDI_SUCCESS | Successfully set up the mapping for data access. |
| DDI_FAILURE | Invalid register number rnumber, offset offset, or length len. |
| DDI_REGS_ACC_CONFLICT | Cannot enable the register mapping due to access conflicts with other enabled mappings. |

CONTEXT ddi_regs_map_setup() must be called from user or kernel context.

SEE ALSO ddi_regs_map_free(9F), ddi_device_acc_attr(9S)

-5- ddi_dma_mem_alloc (9F)  Kernel Functions for Drivers  ddi_dma_mem_alloc (9F)

NAME ddi_dma_mem_alloc - allocate memory for DMA transfer

SYNOPSIS

```
#include <sys/ddi.h>
include <sys/sunddi.h> int ddi_dma_mem_alloc(ddi_dma_handle_t handle, uint_t length,
    ddi_device_acc_attr_t *accattrp, ulong_t flags,
    int (*waitfp)(caddr_t), caddr_t arg, caddr_t *kaddrp,
    uint_t *real_length, ddi_acc_handle_t *handlep);
```

ARGUMENTS

| | |
|---|---|
| *handle* | The DMA handle previously allocated by a call to ddi_dma_alloc_handle(9F). |
| *length* | The length in bytes of the desired allocation. |
| *accattrp* | Pointer to a device access attribute structure of this device (see ddi_device_acc_attr(9S)). |
| *flags* | Data transfer mode flags. Possible values are: |
| | DDI_DMA_STREAMING　　Sequential, unidirectional, block-sized, and block-aligned transfers. |
| | DDI_DMA_CONSISTENT　　Nonsequential transfers of small objects. |
| *waitfp* | The address of a function to call back later if resources are not available now. The special function addresses DDI_DMA_SLEEP and DDI_DMA_DONTWAIT are taken to mean, respectively, wait until resources are available or, do not wait and do not schedule a callback. |
| *arg* | Argument to be passed to the callback function, if such a function is specified. |
| *kaddrp* | On successful return, *kaddrp points to the allocated memory. |
| *real_length | The amount of memory, in bytes, allocated. Alignment and padding requirements may require ddi_dma_mem_alloc() to allocate more memory than requested in *length*. |
| *handlep* | Pointer to a data access handle. |

INTERFACE LEVEL

Solaris DDI specific (Solaris DDI).

DESCRIPTION ddi_dma_mem_alloc() allocates memory for DMA transfers to or from a device. The allocation will obey the alignment, padding constraints and device granularity as specified by the DMA attributes (see ddi_dma_attr(9S)) passed to ddi_dma_alloc_handle(9F) and the more restrictive attributes imposed by the system.

*flags* should be set to DDI_DMA_STREAMING if the device is doing sequential, unidirectional, block-sized, and block-aligned transfers to or from memory. The alignment and padding constraints specified by the *minxfer* and *burstsizes* fields in the DMA attribute structure, ddi_dma_attr(9S) (see ddi_dma_alloc_handle(9F)) will be used to allocate the most effective hardware support for large transfers. For example, if an I/O transfer can be sped up by using an I/O cache, which has a minimum transfer of one cache line, ddi_dma_mem_alloc() will align the memory at a cache line boundary and it will round up *real_length to a multiple of the cache line size.

*flags* should be set to DDI_DMA_CONSISTENT if the device accesses memory randomly, or if synchronization steps using ddi_dma_sync(9F) need to be as efficient as possible. I/O parameter blocks used for communication between a device and a driver should be allocated using DDI_DMA_CONSISTENT.

ddi_dma_mem_alloc(9F)　　　　Kernel Functions for Drivers　　　　ddi_dma_mem_alloc(9F)

The device access attributes are specified in the location pointed by the *accattrp* argument (see ddi_device_acc_attr(9S)).

The data access handle is returned in *handlep*. *handlep* is opaque - drivers may not attempt to interpret its value. To access the data content, the driver must invoke ddi_getb(9F) or ddi_getb(9F) (depending on the data transfer direction) with the data access handle.

DMA resources must be established before performing a DMA transfer by passing *kaddrp* and *real_length* as returned from ddi_dma_mem_alloc() and the flag DDI_DMA_STREAMING or DDI_DMA_CONSISTENT to ddi_dma_addr_bind_handle(9F). In addition, to ensure the consistency of a memory object shared between the CPU and the device after a DMA transfer, explicit synchronization steps using ddi_dma_sync(9F) or ddi_dma_unbind_handle(9F) are required.

RETURN VALUES ddi_dma_mem_alloc() returns:

DDI_SUCCESS　　Memory successfully allocated.

DDI_FAILURE　　Memory allocation failed.

CONTEXT ddi_dma_mem_alloc() can be called from user or interrupt context, except when *waitfp* is set to DDI_DMA_SLEEP, in which case it can be called from user context only.

SEE ALSO ddi_dma_addr_bind_handle(9F), ddi_dma_alloc_handle(9F), ddi_dma_unbind_handle(9F), ddi_dma_mem_free(9F), ddi_dma_sync(9F), ddi_getb(9F), ddi_putb(9F)

*Writing Device Drivers* ddi_getb(9F)  Kernel Functions for Drivers  ddi_getb(9F)

NAME ddi_getb, ddi_getw, ddi_getl, ddi_getll - read data from the mapped memory address, device register or allocated DMA memory address

SYNOPSIS include <sys/ddi.h>
include <sys/sunddi.h> uchar_t ddi_getb(ddi_acc_handle_t *handle*, uchar_t **dev_addr*);

ushort_t ddi_getw(ddi_acc_handle_t *handle*, ushort_t **dev_addr*);

ulong_t ddi_getl(ddi_acc_handle_t *handle*, ulong_t **dev_addr*);

unsigned long long ddi_getll(ddi_acc_handle_t *handle*,
    unsigned long long **dev_addr*);

INTERFACE LEVEL

Solaris DDI specific (Solaris DDI).

ARGUMENTS

*handle*    The data access handle returned from setup calls, such as ddi_regs_map_setup(9F).

*dev_addr*  Base device address.

DESCRIPTION

The ddi_getb(), ddi_getw(), ddi_getl(), and ddi_getll() functions read 8 bits, 16 bits, 32 bits and 64 bits of data, respectively, from the device address, *dev_addr*.

Each individual datum will automatically be translated to maintain a consistent view between the host and the device based on the encoded information in the data access handle. The translation may involve byte-swapping if the host and the device have incompatible endian characteristics.

RETURN VALUES

These functions return the value read from the mapped address.

CONTEXT

These functions can be called from user, kernel, or interrupt context.

SEE ALSO ddi_putb(9F),      ddi_rep_getb(9F),      ddi_rep_putb(9F),      ddi_regs_map_setup(9F),
ddi_regs_map_free(9F)

ddi_putb(9F)  Kernel Functions for Drivers  ddi_putb(9F)

NAME ddi_putb, ddi_putw, ddi_putl, ddi_putll - write data to the mapped memory address, device register or allocated DMA memory address

SYNOPSIS include <sys/ddi.h>
include <sys/sunddi.h> void ddi_putb(ddi_acc_handle_t *handle*, uchar_t *dev_addr*, uchar_t *value*);

void ddi_putw(ddi_acc_handle_t *handle*, ushort_t *dev_addr*, ushort_t *value*);

void ddi_putl(ddi_acc_handle_t *handle*, ulong_t *dev_addr*, ulong_t *value*);

void ddi_putll(ddi_acc_handle_t *handle*, unsigned long long *dev_addr*,
    unsigned long long *value*);

INTERFACE LEVEL

Solaris DDI specific (Solaris DDI).

ARGUMENTS

*handle*   The data access handle returned from setup calls, such as ddi_regs_map_setup(9F).

*value*    The data to be written to the device.

*dev_addr* Base device address.

DESCRIPTION

These routines generate a write of various sizes to the mapped memory or device register. The ddi_putb(), ddi_putw(), ddi_putl(), and ddi_putll() functions write 8 bits, 16 bits, 32 bits and 64 bits of data, respectively, to the device address, *dev_addr*.

Each individual datum will automatically be translated to maintain a consistent view between the host and the device based on the encoded information in the data access handle. The translation may involve byte-swapping if the host and the device have incompatible endian characteristics.

CONTEXT

These functions can be called from user, kernel, or interrupt context.

SEE ALSO ddi_getb(9F), ddi_regs_map_free(9F), ddi_regs_map_setup(9F), ddi_rep_getb(9F), ddi_rep_putb(9F), ddi_device_acc_attr(9S)

ddi_rep_getb(9F)　　　　　　　　　Kernel Functions for Drivers　　　　　　　　　ddi_rep_getb(9F)

NAME ddi_rep_getb, ddi_rep_getw, ddi_rep_getl, ddi_rep_getll - read data from the mapped memory address, device register or allocated DMA memory address

SYNOPSIS

```
#include <sys/ddi.h>
include <sys/sunddi.h> void ddi_rep_getb(ddi_acc_handle_t handle, uchar_t *host_addr, uchar_t *dev_addr,
    uint_t repcount, ulong_t flags);

void ddi_rep_getw(ddi_acc_handle_t handle, ushort_t *host_addr, ushort_t *dev_addr,
    uint_t repcount, ulong_t flags);

void ddi_rep_getl(ddi_acc_handle_t handle, ulong_t *host_addr, ulong_t *dev_addr,
    uint_t repcount, ulong_t flags);

void ddi_rep_getll(ddi_acc_handle_t handle, unsigned long long *host_addr,
    unsigned long long *dev_addr, uint_t repcount, ulong_t flags);
```

INTERFACE LEVEL

Solaris DDI specific (Solaris DDI).

ARGUMENTS

| | |
|---|---|
| *handle* | The data access handle returned from setup calls, such as ddi_regs_map_setup(9F). |
| *host_addr* | Base host address. |
| *dev_addr* | Base device address. |
| *repcount* | Number of data accesses to perform. |
| *flags* | Device address flags: |

DDI_DEV_AUTOINCR

Automatically increment the device address, *dev_addr*, during data accesses.

DDI_DEV_NO_AUTOINCR

Do not advance the device address, *dev_addr*, during data accesses.

DESCRIPTION

These routines generate multiple reads from the mapped memory or device register. *repcount* data is copied from the device address, *dev_addr*, to the host address, *host_addr*. For each input datum, the ddi_rep_getb(), ddi_rep_getw(), ddi_rep_getl(), and ddi_rep_getll() functions read 8 bits, 16 bits, 32 bits and 64 bits of data, respectively, from the device address, *dev_addr*. *dev_addr* and *host_addr* must be aligned to the datum boundary described by the function.

Each individual datum will automatically be translated to maintain a consistent view between the host and the device based on the encoded information in the data access handle. The translation may involve byte-swapping if the host and the device have incompatible endian characteristics.

When the *flags* argument is set to DDI_DEV_AUTOINCR, these functions treat the device address, *dev_addr*, as a memory buffer location on the device and increment its address on the next input datum. However, when the *flags* argument is to DDI_DEV_NO_AUTOINCR, the same device address will be used for every datum access. For example, this flag may be useful when reading from a data register.

RETURN VALUES

These functions return the value read from the mapped address.

CONTEXT

These functions can be called from user, kernel, or interrupt context.

ddi_rep_getb (9F)	Kernel Functions for Drivers	ddi_rep_getb (9F)

SEE ALSO
ddi_getb(9F), ddi_putb(9F), ddi_rep_putb(9F), ddi_regs_map_setup(9F), ddi_regs_map_free(9F)

ddi_rep_putb(9F)  Kernel Functions for Drivers  ddi_rep_putb(9F)

NAME ddi_rep_putb, ddi_rep_putw, ddi_rep_putl, ddi_rep_putll - write data to the mapped memory address, device register or allocated DMA memory address

SYNOPSIS include <sys/ddi.h>
include <sys/sunddi.h> void ddi_rep_putb(ddi_acc_handle_t *handle*, uchar_t *host_addr*, uchar_t *dev_addr*,
    uint_t *repcount*, ulong_t *flags*);

void ddi_rep_putw(ddi_acc_handle_t *handle*, ushort_t *host_addr*, ushort_t *dev_addr*,
    uint_t *repcount*, ulong_t *flags*);

void ddi_rep_putl(ddi_acc_handle_t *handle*, ulong_t *host_addr*, ulong_t *dev_addr*,
    uint_t *repcount*, ulong_t *flags*);

void ddi_rep_putll(ddi_acc_handle_t *handle*, unsigned long long *host_addr*,
    unsigned long long *dev_addr*, uint_t *repcount*, ulong_t *flags*);

INTERFACE LEVEL

Solaris DDI specific (Solaris DDI).

ARGUMENTS

*handle*    The data access handle returned from setup calls, such as ddi_regs_map_setup(9F).

*host_addr*    Base host address.

*dev_addr*    Base device address.

*repcount*    Number of data accesses to perform.

*flags*    Device address flags:

DDI_DEV_AUTOINCR
    Automatically increment the device address, *dev_addr*, during data accesses.

DDI_DEV_NO_AUTOINCR
    Do not advance the device address, *dev_addr*, during data accesses.

DESCRIPTION

These routines generate multiple writes to the mapped memory or device register. *repcount* data is copied from the host address, *host_addr*, to the device address, *dev_addr*. For each input datum, the ddi_rep_putb(), ddi_rep_putw(), ddi_rep_putl(), and ddi_rep_putll() functions write 8 bits, 16 bits, 32 bits and 64 bits of data, respectively, to the device address, *dev_addr*. *dev_addr* and *host_addr* must be aligned to the datum boundary described by the function.

Each individual datum will automatically be translated to maintain a consistent view between the host and the device based on the encoded information in the data access handle. The translation may involve byte-swapping if the host and the device have incompatible endian characteristics.

When the *flags* argument is set to DDI_DEV_AUTOINCR, these functions treat the device address, *dev_addr*, as a memory buffer location on the device and increment its address on the next input datum. However, when the *flags* argument is to DDI_DEV_NO_AUTOINCR, the same device address will be used for every datum access. For example, this flag may be useful when writing to a data register.

CONTEXT

These functions can be called from user, kernel, or interrupt context.

SEE ALSO ddi_getb(9F), ddi_putb(9F), ddi_regs_map_free(9F), ddi_regs_map_setup(9F), ddi_rep_getb(9F), ddi_device_acc_attr(9S)

What is claimed is:

1. A method for achieving portability of a device driver between at least two host computers for communicating with a device having first data access attributes, the driver having computer instructions for execution by a host computer having second data access attributes and a memory storing the computer instructions of the driver, the method comprising the steps of:
   - allocating memory space in a device driver interface (DDI) environment for a handle;
   - selecting, by the DDI environment, at least one of at least two DDI data access function implementations, wherein the selected implementation accounts for differences between the first and second data access attributes;
   - storing, by the DDI environment, information in the handle for accessing the selected DDI data access function implementation; and
   - passing, by the DDI environment, a handle pointer to the driver for opaque access by the driver to the device through the DDI environment, the DDI environment using the information in the handle for invoking the selected DDI data access function implementation, the driver having no information about the second data access attributes.

2. A method as recited in claim 1, wherein the step of storing information in the handle comprises storing an address of the selected DDI data access function implementation in the handle.

3. A method as recited in claim 2, wherein the handle has a host specific portion, and wherein the step of storing the address comprises storing the address in the host specific portion of the handle.

4. A method as recited in claim 1, wherein the handle has a bus specific portion, further comprising the step of storing data for identifying the device's bus parameters in the bus specific portion of the handle.

5. The method as recited in claim 1, further comprising the step of passing the handle pointer from the driver to a function call in the DDI environment for indirectly calling the selected DDI data access function implementation.

6. The method as recited in claim 1, further comprising the step of passing the handle pointer from the driver to a function call in the DDI environment for direct data access to the device with host hardware.

7. The method as recited in claim 1, further comprising the step of passing, by tho driver, the first data access attributes from the device driver to the DDI environment.

8. The method as recited in claim 7, wherein the handle comprises a common portion for storing the first data access attributes.

9. An apparatus for achieving portability of a device driver between at least two host computers for communicating with a device having first data access attributes, the driver having computer instructions for execution by a host computer having second data access attributes and a memory storing the computer instructions of the driver, the apparatus comprising:
   - a device driver interface (DDI) environment;
   - a setup mechanism in the DDI environment configured to allocate memory space in the DDI environment for a handle;
   - a selector in the DDI environment configured to select at least one of at least two DDI data access function implementations, wherein the selected implementation accounts for differences between the first and second data access attributes;
   - a storage medium in the DDI environment configured to store information into the handle for accessing the selected DDI data access function implementation; and
   - a return function mechanism configured to have the DDI environment pass a handle pointer to the driver for opaque access by the driver to the device through the DDI environment, the DDI environment using the information in the handle for invoking the selected DDI data access function implementation, the driver having no information about the second data access attributes.

10. An apparatus as retired in claim 9, wherein the information for accessing the selected DDI data access function implementation comprises an address of the selected DDI data access function implementation in the handle.

11. An apparatus as recited in claim 10, wherein the handle has a host specific portion, and wherein the storage medium is configured to store the address in the host specific portion of the handle.

12. An apparatus as recited in claim 9, wherein the handle has a bus specific portion, further comprising a storage medium configured to store data for identifying the device's bus parameters in the bus specific portion of the handle.

13. The apparatus as recited in claim 9, further comprising a function calling mechanism configured to pass the handle pointer from the driver to a function call in the DDI environment for indirectly calling the selected DDI data access function implementation.

14. The apparatus as recited in claim 9, further comprising a function calling mechanism configured to pass the handle pointer from the drive to a function call in the DDI environment for direct data access to the device with host hardware.

15. The apparatus as recited in claim 9, further comprising a function calling mechanism configured to pass from the driver to the DDI environment the first data access attributes.

16. The apparatus as recited in claim 15, wherein the handle comprises a common portion for storing the first data access attributes.

17. A computer program product comprising:
   - a computer usable medium having computer readable code embodied therein for causing portability of a device driver between at least two host computers each having a memory, the computer program product comprising:
   - computer readable program code devices configured to cause a computer to effect allocating memory space in a device driver interface (DDI) environment for a handle;
   - computer readable program code devices configured to cause a computer to effect selecting, by the DDI environment, at least one of at least two DDI data access function implementations, wherein the selected implementation accounts for differences between the first and second data access attributes;
   - computer readable program code devices configured to cause a computer to effect storing, by the DDI environment, information in the handle for accessing the selected DDI data access function implementation; and
   - computer readable program code devices configured to cause a computer to effect passing, by the DDI environment, a handle pointer to the driver for opaque access by the driver to the device through the DDI environment, the DDI environment using the information in the handle for invoking the selected DDI data access function implementation, the driver having no information about the second data access attributes.

18. A computer program product as recited in claim 17, wherein the computer readable program code devices effecting storing information in the handle comprises computer readable program code devices to effect storing an address of the selected DDI data access function implementation in the handle.

19. A computer program product as recited in claim 18, wherein the handle has a host specific portion, and wherein the computer readable program code devices effecting storing the address comprises computer readable program code devices to effect storing the address in the host specific portion of the handle.

20. A computer program product as recited in claim 17, wherein the handle has a bus specific portion, further comprising computer readable program code devices to effect storing data for identifying the device's bus parameters in the bus specific portion of the handle.

21. The computer program product as recited in claim 17, further comprising computer readable program code devices to effect passing the handle pointer from the driver to a function call in the DDI environment for indirectly calling the selected DDI data access function implementation.

22. The computer program product as recited in claim 17, further comprising computer readable program code devices to effect passing the handle pointer from the driver to a function call in the DDI environment for direct data access to the device with host hardware.

23. The computer program product as recited in claim 17, further comprising computer readable program code devices to effect passing, by the driver, the first data access attributes from the device driver to the DDI environment.

* * * * *